(12) United States Patent
Yamamoto

(10) Patent No.: US 9,876,460 B2
(45) Date of Patent: Jan. 23, 2018

(54) AUTOMOBILE EQUIPPED WITH DRIVE MOTOR

(71) Applicant: Toyota Jidosha Kabushiki Kaisha, Toyota-shi, Aichi-ken (JP)

(72) Inventor: Masaya Yamamoto, Owariasahi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/441,584

(22) Filed: Feb. 24, 2017

(65) Prior Publication Data

US 2017/0257052 A1   Sep. 7, 2017

(30) Foreign Application Priority Data

Mar. 2, 2016  (JP) ................. 2016-040387

(51) Int. Cl.
| | | |
|---|---|---|
| *H02P 29/024* | (2016.01) | |
| *H02P 27/06* | (2006.01) | |
| *B60L 11/18* | (2006.01) | |
| *H02J 7/00* | (2006.01) | |
| *B60K 6/46* | (2007.10) | |
| *B60K 6/365* | (2007.10) | |
| *B60K 6/24* | (2007.10) | |

(52) U.S. Cl.
CPC .............. *H02P 29/025* (2013.01); *B60K 6/24* (2013.01); *B60K 6/365* (2013.01); *B60K 6/46* (2013.01); *B60L 11/1803* (2013.01); *B60L 11/187* (2013.01); *B60L 11/1861* (2013.01); *B60L 11/1868* (2013.01); *H02J 7/007* (2013.01); *H02P 27/06* (2013.01); *B60L 2220/14* (2013.01)

(58) Field of Classification Search
CPC ......... H02P 29/025; H02P 27/06; B60K 6/24; B60K 6/46; B60L 1/187; H02J 7/007
USPC .......................................................... 318/139
See application file for complete search history.

(56) References Cited

U.S. PATENT DOCUMENTS

| | | | | |
|---|---|---|---|---|
| 8,013,548 | B2 * | 9/2011 | King ................... | B60L 11/1868 307/10.1 |
| 8,594,873 | B2 * | 11/2013 | Kimura ............... | B60L 11/1811 318/139 |
| 2008/0218104 | A1 * | 9/2008 | Lukic ................... | B60L 11/005 318/139 |
| 2012/0065827 | A1 * | 3/2012 | Kimura ............... | B60L 11/1811 701/22 |
| 2012/0143425 | A1 * | 6/2012 | Yamamoto ............ | B60W 10/24 701/22 |

(Continued)

FOREIGN PATENT DOCUMENTS

| | | |
|---|---|---|
| EP | 2815945 A1 | 12/2014 |
| WO | 2013/121574 A1 | 8/2013 |

*Primary Examiner* — Kawing Chan
(74) *Attorney, Agent, or Firm* — Dinsmore & Shohl LLP

(57) ABSTRACT

In an automobile equipped with a drive motor, a positive value is set to a distribution factor during EV driving in a first CD mode. During EV driving in a second CD mode (a mode in which driving performance is limited as compared to the first CD mode), a value 0 is set to the distribution factor. First and second boosting converters are controlled such that an electric current (discharge power from the second battery) of a reactor of a second boosting converter when the distribution factor is small becomes smaller as compared to that when the distribution factor is large.

4 Claims, 4 Drawing Sheets

(56) References Cited

U.S. PATENT DOCUMENTS

| | | | |
|---|---|---|---|
| 2012/0187755 A1* | 7/2012 | Sone | B60L 1/003 |
| | | | 307/9.1 |
| 2014/0350761 A1* | 11/2014 | Endo | B60W 20/00 |
| | | | 701/22 |
| 2015/0202985 A1* | 7/2015 | Le | B60L 11/1877 |
| | | | 307/9.1 |
| 2015/0231988 A1* | 8/2015 | Hisada | B60L 11/1874 |
| | | | 318/139 |

* cited by examiner

AUTOMOBILE EQUIPPED WITH DRIVE MOTOR

CROSS-REFERENCE TO RELATED APPLICATIONS

This application claims priority to Japanese Patent Application No. 2016-040387 filed on Mar. 2, 2016, which is incorporated herein by reference in its entirety.

BACKGROUND

1. Technical Field

The present disclosure relates to an automobile equipped with a drive motor, and particularly to an automobile equipped with a motor, a first battery, a second battery, a first boosting converter, and a second boosting converter.

2. Description of Related Art

In the related art, as this type of automobile, an automobile configured to include an engine and a motor for driving, and a battery that exchanges power with the motor and to control the engine and the motor such that switching is made among a first charge depleting (CD) mode, a second CD mode, and a charge sustaining (CS) mode and driving is performed is suggested (for example, refer to International Publication WO2013/121574). Here, the first CD mode and the second CD mode are modes in which priority is given to EV driving out of EV driving and the HV driving as compared to the CS mode. The EV driving is driving not accompanied by the operation of the engine, and the HV driving is driving accompanied by the operation of the engine. The second CD mode is a mode in which the EV driving is sustained as compared to the first CD mode (a starting threshold value of the engine with respect to a required power is made large), and an upper limit value of driving power during the EV driving is made small.

SUMMARY

In the automobile equipped with the drive motor, in a case where a first battery, and a second battery having a smaller rated capacity than the first battery are included, driving performance according to modes may be unable to be sufficiently exhibited depending on methods for using the first battery and the second battery. If the state of charge of the second battery becomes relatively low in the second CD mode, when switching is performed from the second CD mode to the first CD mode after that, sufficient power cannot be output from the second battery, and the driving performance according to the first CD mode may not be sufficiently exhibited.

In view of the above circumstances, the present disclosure provides an automobile equipped with a drive motor that switches the upper limit output of the motor depending on a mode and can exhibit driving performance according to the mode.

Thus, according to an aspect of the present disclosure, an automobile equipped with a drive motor having a first battery, a second battery, a first boosting converter, a second boosting converter, and an electronic control unit is provided. The second battery is configured to have a rated capacity smaller than a rated capacity of the first battery. The first boosting converter is configured to supply a power from the first battery to the motor with boosting of a voltage inputted to the first boosting converter. The second boosting converter is configured to supply a power from the second battery to the motor with boosting of a voltage inputted to the second boosting converter. The electronic control unit is configured to (i) set an execution mode from a plurality of modes including a first mode and a second mode and control the motor on the basis of the execution mode, the first mode being a mode in which the motor is driven in a range having a first output as an upper limit and the second mode being a mode in which the motor is driven in a range having a second output smaller than the first output having an upper limit, (ii) control the first boosting converter and the second boosting converter according to the execution mode, and (iii) to control the first boosting converter and the second boosting converter such that a distribution factor when the execution mode is the second mode becomes smaller than a distribution factor when the execution mode is the first mode, the distribution factor being a ratio of a discharge power of the second battery to a total discharge power of the first battery and the second battery.

In the automobile equipped with a drive motor of this present disclosure, the execution mode is set from the plurality of modes including the first mode in which the motor is driven in the range having the first output as the upper limit, and the second mode in which the motor is driven in the range having the second output smaller than the first output as the upper limit, and the motor is controlled on the basis of the execution mode. Also, the first boosting converter and the second boosting converter are controlled such that the distribution factor, which is the ratio of the discharge power of the second battery to the total discharge power of the first battery and the second battery, when the execution mode is the second mode, becomes smaller than that when the execution mode is the first mode. Accordingly, the degree of a decrease in the state of charge of the second battery in the second mode, can be suppressed as compared to that in the first mode. As a result, when switching to the first mode is performed after that, occurrence of a problem that sufficient power cannot be discharged from the second battery in the first mode can be suppressed, and insufficient exhibition of the driving performance according to the first mode can be suppressed.

In the automobile equipped with a drive motor, the electronic control unit may be configured to perform control such that the distribution factor becomes a value 0 when the execution mode is the second mode. Additionally, the electronic control unit may be configured to perform control such that the distribution factor becomes a predetermined value when the execution mode is the first mode and such that the distribution factor becomes larger than a value 0 and becomes a value smaller than the predetermined value when the execution mode is the second mode. Moreover, the electronic control unit may be configured to stop driving of the second boosting converter when the execution mode is the second mode. According to these, the degree of a decrease in the state of charge of the second battery in the second mode, can be further suppressed.

In the automobile equipped with a drive motor, the electronic control unit is configured to: (i) set the first output to a sum of an allowable discharge power of the first battery and an allowable discharge power of the second battery, and (ii) set the second output to the allowable discharge power of the first battery. According to this, since the motor is driven within a range of the sum of the allowable discharge power of the first battery and the allowable discharge power of the second battery in the first mode, the driving performance according to the first mode can more sufficiently be exhibited. Additionally, since the motor is driven within a range of the allowable discharge power of the first battery in the second mode, the driving performance according to the second mode can more sufficiently be exhibited even if the distribution factor is the value 0 or a value smaller than the predetermined value.

In the automobile with a drive motor, the electronic control unit may be configured to (i) set an allowable discharge power of the second battery when a temperature of the second battery is higher than an allowable temperature range so as to be lower than the allowable discharge power when the temperature of the second battery is within the allowable temperature range, and (ii) set the allowable discharge power of the second battery when a state of charge of the second battery is smaller than an allowable ratio range so as to be smaller than the allowable discharge power when the state of charge of the second battery is within the allowable ratio range. According to this, in the second mode, the distribution factor is small. Accordingly, reduction of the allowable discharge power of the second battery can be suppressed by suppressing a decrease in the state of charge of the second battery and a rise in the temperature of the second battery. As a result, when switching to the first mode is performed after that, occurrence of a problem that sufficient power cannot be discharged from the second battery in the first mode can be suppressed.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Next, modes for carrying out the present disclosure will be described using embodiments.

Figure 1:
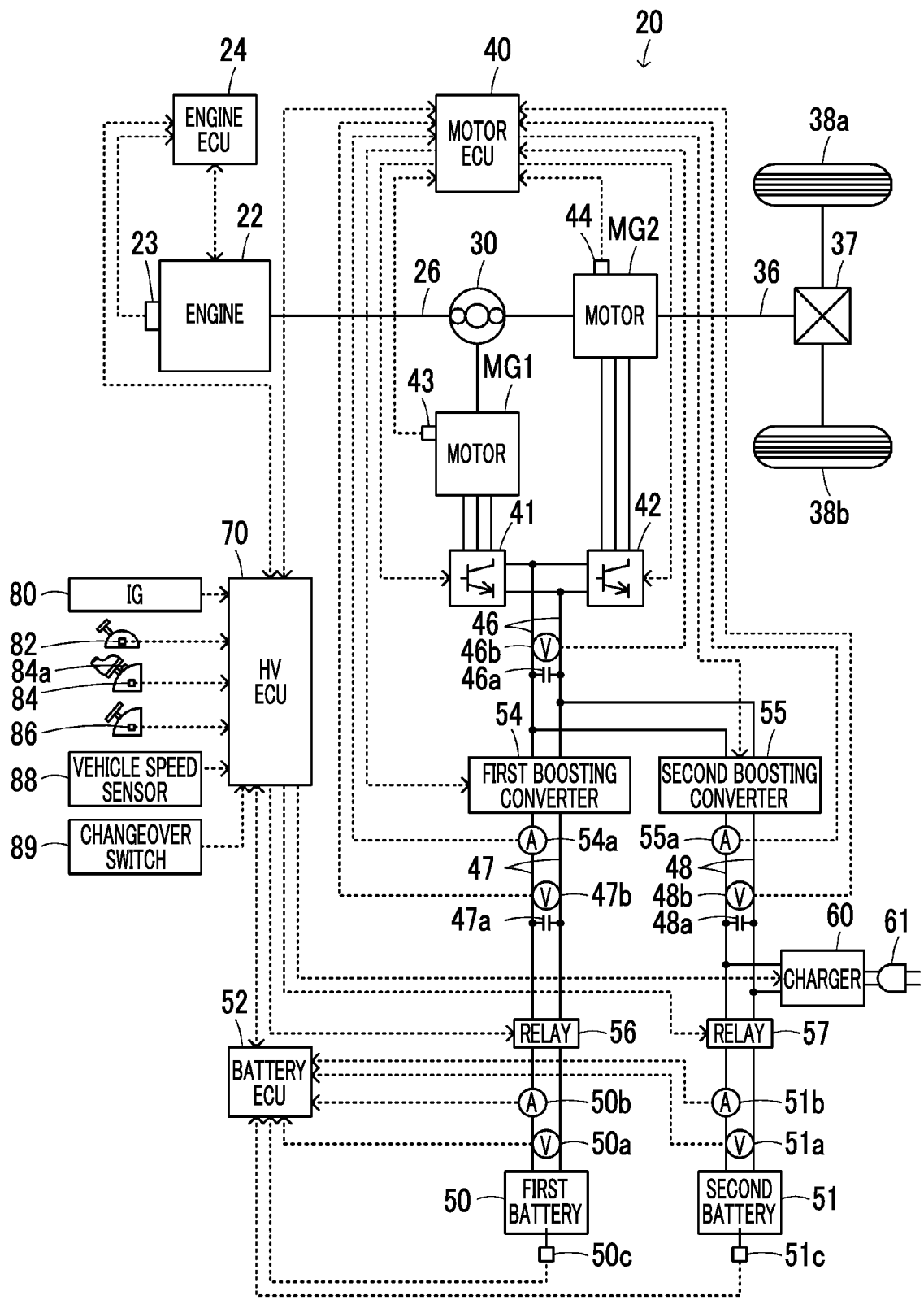
FIG. 1 is a configuration view illustrating the outline of the configuration of an automobile (hybrid automobile) equipped with a drive motor as an embodiment of the present disclosure.
Figure 2:
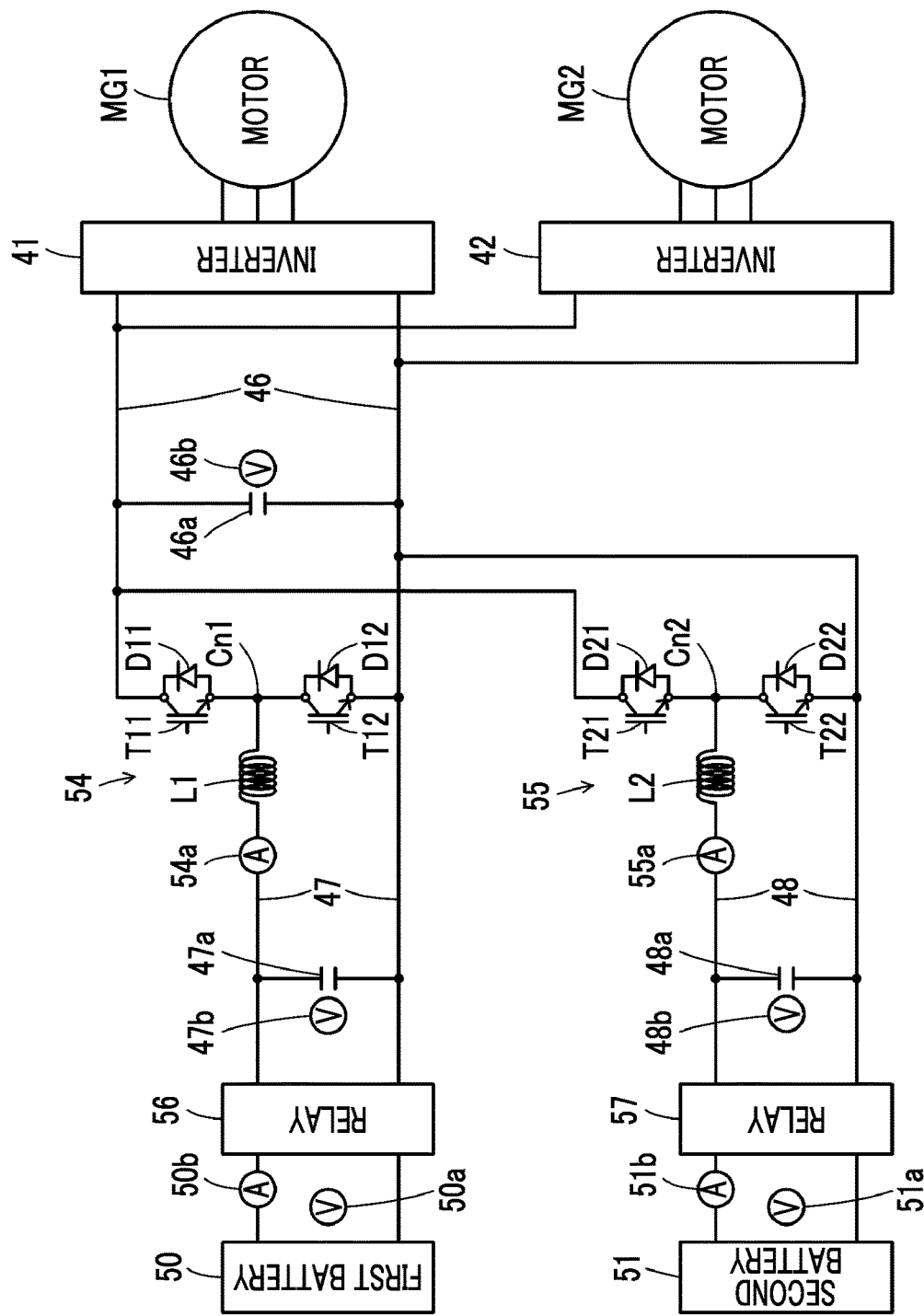
FIG. 2 is a configuration view illustrating the outline of the configuration of an electrical drive system including motors MG1 and MG2 illustrated in FIG. 1.

FIG. 1 is a configuration view illustrating the outline of the configuration of a hybrid automobile 20 as one embodiment of the present disclosure. FIG. 2 is a configuration view illustrating the outline of the configuration of an electrical drive system including motors MG1, MG2.

As illustrated in FIG. 1, the hybrid automobile 20 of the embodiment includes an engine 22, a planetary gear set 30, the motors MG1, MG2, inverters 41, 42, first and second boosting converters 54, 55, first and second batteries 50, 51, first and second system main relays 56, 57, a charger 60, and a hybrid automobile electronic control unit (hereinafter, an HVECU) 70.

The engine 22 is constituted as an internal combustion engine that outputs power by using gasoline, gas oil, or the like as fuel. The operation of the engine 22 is controlled by an electronic control unit 24 for an engine (hereinafter referred to as an "engine ECU").

The engine ECU 24 is constituted as a microprocessor centered on a CPU. The engine ECU 24 includes, in addition to the CPU, a ROM that stores a processing program, a RAM that temporarily stores data, input and output ports, and communication ports. Signals from various sensors required to control the operation of the engine 22 are input to the engine ECU 24 via the input ports. The signals from these various sensors are, for example, a crank angle $\theta cr$ from a crank position sensor 23 that detects the rotational position of a crank shaft 26 of the engine 22. Various control signals for controlling the operation of the engine 22 are output via output ports from the engine ECU 24. The engine ECU 24 is connected to the HVECU 70 via the communication ports. The engine ECU 24 calculates the rotational speed Ne of the engine 22 on the basis of the crank angle $\theta cr$ from the crank position sensor 23.

The planetary gear set 30 is constituted as a single pinion planetary gear mechanism. A rotor of the motor MG1 is connected to a sun gear of the planetary gear set 30. A driving shaft 36 coupled to driving wheels 38a, 38b via a differential gear 37 is connected to a ring gear of the planetary gear set 30. The crank shaft 26 of the engine 22 is connected to a carrier of the planetary gear set 30.

The motor MG1 is constituted as, for example, a synchronous generator motor, and as described above, the rotor is connected to the sun gear of the planetary gear set 30. The motor MG2 is constituted as, for example, a synchronous generator motor, and a rotor thereof is connected to the driving shaft 36. The inverters 41, 42 are used for driving the motors MG1, MG2, and are connected to a high-voltage system power line 46. The motors MG1, MG2 are rotationally driven by controlling switching of a plurality of switching elements (not illustrated) of the inverters 41, 42 using an electronic control unit 40 for motors (hereinafter referred to as a "motor ECU").

As illustrated in FIG. 2, the first boosting converter 54 is connected to the high-voltage system power line 46 to which the inverters 41, 42 are connected, and a first low-voltage system power line 47 to which the first battery 50 is connected. The first boosting converter 54 has two transistors T11, T12, two diodes D11, D12, and a reactor L1. The transistor T11 is connected to a positive electrode line of the high-voltage system power line 46. The transistor 112 is connected to the transistor T11, and negative electrode lines of the high-voltage system power line 46 and the first low-voltage system power line 47. The two diodes D11, D12 are respectively connected to the transistors T11, T12 in parallel in a reverse direction. The reactor L1 is connected to a midpoint Cn1 of the transistors T11, T12, and the positive electrode line of the first low-voltage system power line 47. When a ratio of ON times of the transistors T11, T12 is controlled by the motor ECU 40, the first boosting converter 54 supplies the power of the first low-voltage system power line 47 to the high-voltage system power line 46 with boosting of a voltage or supplies the power of the high-voltage system power line 46 to the first low-voltage system power line 47 with step-down of a voltage.

The second boosting converter 55 is connected to the high-voltage system power line 46, and a second low-voltage system power line 48 to which a second battery 51 is connected. The second boosting converter 55 has two transistors T21, T22, two diodes D21, D22, and a reactor L2. The transistor T21 is connected to a positive electrode line of the high-voltage system power line 46. The transistor 122 is connected to the transistor T21, and negative electrode lines of the high-voltage system power line 46 and the second low-voltage system power line 48. The two diodes D21, D22 are respectively connected to transistors T21, T22 in parallel in a reverse direction. The reactor L2 is connected to a midpoint Cn2 of the transistors T21, T22, and the positive electrode line of the second low-voltage system power line 48. When a ratio of ON times of the transistors T21, T22 is controlled by the motor ECU 40, the second boosting converter 55 supplies the power of the second low-voltage system power line 48 to the high-voltage system power line 46 with boosting of a voltage or supplies the power of the high-voltage system power line 46 to the second low-voltage system power line 48 with step-down of a voltage.

A smoothing capacitor 46a is attached to a positive electrode bus bar and a negative electrode bus bar of the high-voltage system power line 46. A smoothing capacitor 47a is attached to a positive electrode bus bar and a negative electrode bus bar of the first low-voltage system power line 47. A smoothing capacitor 48a is attached to a positive electrode bus bar and a negative electrode bus bar of the second low-voltage system power line 48.

The motor ECU 40 is constituted as a microprocessor centered on a CPU, and includes, in addition to the CPU, a ROM that stores a processing program, a RAM that temporarily stores data, input and output ports, and communication ports. As illustrated in FIG. 1, the signals from the various sensors required to control driving of the motors MG1, MG2 and the first and second boosting converters 54, 55 are input to the motor ECU 40 via the input ports. As the signals to be input to the motor ECU 40, there are, for example, rotational positions $\theta m1$, $\theta m2$ from rotational position detecting sensors 43, 44 that detect the rotational positions of the rotor of the motors MG1, MG2; and the like. Additionally, there are a voltage VH, voltages VL1, VL2, and the like as the signals to be input to the motor ECU 40. Here, the voltage VH is a voltage of a capacitor 46a (high-voltage system power line 46) from a voltage sensor 46b attached between terminals of the capacitor 46a. The voltage VL1 is a voltage of a capacitor 47a (first low-voltage system power line 47) from a voltage sensor 47b attached between terminals of the capacitor 47a. The voltage VL2 is a voltage of a capacitor 48a (second low-voltage system power line 48) from a voltage sensor 48b attached between terminals of the capacitor 48a. Moreover, the above signals may include an electric current IL1 of the reactor L1 from a current sensor 54a attached to the positive electrode bus bar of the first low-voltage system power line 47, an electric current IL2 of the reactor L2 from a current sensor 55a attached to the positive electrode bus bar of the second low-voltage system power line 48, and the like.

Switching control signals to the plurality of switching elements (not illustrated) of the inverters 41, 42, switching control signals to a plurality of switching elements (not illustrated) of the first and second boosting converters 54, 55, and the like are output via the output ports from the motor ECU 40. The motor ECU 40 is connected to the HVECU 70 via the communication ports. The motor ECU 40 calculates rotational speeds Nm1, Nm2 of the motors MG1, MG2, on the basis of the rotational positions $\theta m1$, $\theta m2$ of the rotors of the motor MG1, MG2 from the rotational position detecting sensors 43, 44.

The first battery 50 is constituted as, for example, a lithium ion secondary battery or a nickel hydrogen secondary battery. The first battery 50 is connected to the first low-voltage system power line 47, as described above. The second battery 51 is constituted as, for example, a lithium roll secondary battery or a nickel hydrogen secondary battery. The second battery 51 is connected to the second low-voltage system power line 48, as described above. In the embodiment, the first battery 50 consists of a high-capacity battery. The second battery 51 is constituted as a battery with a smaller rated capacity (and a higher power density) than the first battery 50. The first and second batteries 50, 51 is managed by an electronic control unit 52 for batteries (hereinafter referred to as a battery ECU).

The battery ECU 52 is constituted as a microprocessor centered on a CPU, and includes, in addition to the CPU, a ROM that stores a processing program, a RAM that temporarily stores data, input and output ports, and communication ports. Signals required to manage the first and second batteries 50, 51 are input to the battery ECU 52 via the input ports. The signals to be input to the battery ECU 52 may include, for example, voltages Vb1, Vb2 of the first and second batteries 50, 51 from voltage sensors 50a, 51a installed between terminals of the first and second batteries 50, 51, electric current Ib1, Ib2 from the first and second batteries 50, 51 from current sensors 50b, 51b attached to output terminals of the first and second batteries 50, 51, temperatures Tb1, Tb2 of the first and second batteries 50, 51 from temperature sensors 50c, 51c attached to the first and second batteries 50, 51, and the like.

The battery ECU 52 is connected to the HVECU 70 via the communication ports. The battery ECU 52 calculates state of charges SOC1, SOC2 on the basis of integrated values of the electric currents Ib1, Ib2 of the first and second batteries 50, 51 from the current sensors 50b, 51b. Here, the state of charges SOC1, SOC2 are the ratios of the capacities of powers, which are dischargeable from the first and second batteries 50, 51, with respect to rated capacities (total capacities) Sr1, Sr2 of the first and second batteries 50, 51.

Additionally, the battery ECU 52 calculates load limits Wout1, Wout2 on the basis of the temperatures Tb1, Tb2 of the first and second batteries 50, 51 from the temperature sensors 50c, 51c, and the state of charges SOC1, SOC2. Here, the load limits Wout1, Wout2 are allowable discharge powers that may be discharged from the first and second batteries 50, 51. In the embodiment, in consideration of the properties of the first and second batteries 50, 51, the load limits Wout1, Wout2 are set so as to be smaller when the temperatures Tb1, Tb2 are higher than allowable temperature ranges than when the temperatures Tb1, Tb2 are within the allowable temperature ranges and so as to be smaller when the state of charges SOC1, SOC2 are smaller than allowable ratio ranges than that when the state of charges SOC1, SOC2 are within the allowable ratio ranges.

In addition, the first battery 50 is cooled by a cooling device (not illustrated) (suppressed in temperature rise) such that the temperature Tb1 is within its allowable temperature range even when only the first battery 50 out of the first and second batteries 50, 51 exchanges power with the motors MG1, MG2. That is, the temperature rise is suppressed by this cooling device such that the load limit Wout is not prevented from becoming smaller as the temperature Tb1 becomes higher than its allowable temperature range.

The first system main relay 56 is provided on the first low-voltage system power line 47, and performs connection and disconnection between the first boosting converter 54 and the first battery 50. The second system main relay 57 is provided on the second low-voltage system power line 48, and performs connection and disconnection between the second boosting converter 55 and the second battery 51.

The charger 60 is connected to the second low-voltage system power line 48. The charger 60 is configured such that external charge of charging the first and second batteries 50, 51 using the power from an external power source can be performed when a power source plug 61 is connected to an external power source, such as a home power source or an industrial power source, at a charge point, such as a house or a charge station.

The HVECU 70 is constituted as a microprocessor centered on a CPU, and includes, in addition to the CPU, a ROM that stores a processing program, a RAM that temporarily stores data, input and output ports, and communication ports. Signals to be input to the HVECU 70 are, for example, an ignition signal from an ignition switch 80, a shift position SP from a shift position sensor 82, an accelerator opening degree Acc from an accelerator pedal position sensor 84, an ON/OFF signal from a kickdown switch 84a, and the like. Additionally, signals, such as a brake pedal position BP from a brake pedal position sensor 86, a vehicle speed V from a vehicle speed sensor 88, and a switch signal SW from a mode changeover switch 89, are also input to the HVECU 70. The kickdown switch 84a is controlled in position so as to abut against an accelerator pedal when the stepping amount of the accelerator pedal reaches a predetermined amount (for example, 75%, 80%, 85%, or the like) to the total. The kickdown switch 84a outputs an ON signal until abutment thereof against the accelerator pedal is released after the accelerator pedal abuts thereagainst. A spring (not illustrated) is attached to the kickdown switch 84a such that an accelerator operational sensation (stepping sensation) after the accelerator pedal has abutted against the kickdown switch 84a becomes heavier than an accelerator operational sensation until then. The mode changeover switch 89 is a switch that indicates switching between a first CD mode and a second CD mode to be described below. Control signals to the first and second system main relays 56, 57, a control signal to the charger 60, and the like are output via the output ports to the HVECU 70. The HVECU 70 is connected to the engine ECU 24, the motor ECU 40, the battery ECU 52, via the communication ports, as described above.

In the hybrid automobile 20 of the embodiment configured in this way, hybrid driving (HV driving) or electric driving (EV driving) is performed in a charge depleting (CD) mode or a charge sustaining (CS) mode. Here, the CD mode is a mode in which higher priority is given to the EV driving as compared to the CS mode. The HV driving is a mode in which driving is performed with the operation of the engine 22. The EV driving is a mode in which driving is performed without being accompanied by the operation of the engine 22.

In the embodiment, the HVECU 70 controls the charger 60 and the first and second boosting converters 54, 55 such that the first and second batteries 50, 51 are charged using the power from the external power source if the power source plug 61 is connected to the external power source, when system-off occurs (system stop occurs) at the charge point, such as a house or a charge station. Then, when system-on (system startup) occurs, and when the state of charge SOC1 of the first battery 50 is larger than a threshold value Shv1 (for example, 45%, 50%, 55%, or the like), driving is performed in the CD mode until the state of charge SOC1 of the first battery 50 reaches a threshold value Shv2 (for example, 25%, 30%, 35%, or the like) or lower, and driving is performed in the CS mode until system-off occurs after the state of charge SOC1 of the first battery 50 reaches a threshold value Shv2 or lower. Additionally, when system-on occurs and the state of charge SOC1 of the first battery 50 is equal to or lower than the threshold value Shv1, driving is performed in the CS mode until system-off occurs.

Additionally, in the embodiment, the CD mode has the first CD mode and the second CD mode. Here, the first CD mode is a mode in the CD mode in which the engine 22 is started (shifted to the HV driving) when a user's accelerator requirement becomes relatively large during the EV driving. The second CD mode is a mode in the CD mode in which (the upper limit of) the driving performance is limited as compared to the first CD mode, and the engine 22 is started only when the kickdown switch 84a is turned on during the EV driving (the engine 22 is not easily started as compared to the first CD mode). In addition, the second CD mode may be a mode (the EV driving is continued) in which the engine 22 is not started irrespective of a required torque Tp* or the state of the kickdown switch 84a. The switching between the first CD mode and the second CD mode is performed according to the operation of the changeover switch 89 by a driver.

In the EV driving in the first CD mode, the HVECU 70 sets the required torque Tp* required for driving on the basis of the accelerator opening degree Acc and the vehicle speed V (required for the driving shaft 36). Subsequently, a power limit Pmax as an allowable maximum output of the motors MG1, MG2 is set, the set power limit Pmax is divided by the rotational speed Nm2 of the motor MG2, and a torque limit Tm2max as an upper limit of the torque that may be output from the motor MG2 is set. In the embodiment, the sum of the load limits Wout1, Wout2 of the first and second batteries 50, 51 is set to the power limit Pmax.

Subsequently, the required torque Tp* is compared with the torque limit Tm2max. Then, when the required torque Tp* is equal to or lower than the torque limit Tm2max, the required torque Tp* is set to a torque command Tm2* of the motor MG2 and is transmitted to the motor ECU 40. If the torque command Tm2* is received, the motor ECU 40 performs switching control of the plurality of switching elements of the inverter 42 such that the motor MG2 is driven by the torque command Tm2*.

When the required torque Tp* is larger than torque limit Tm2max, the engine 22 is determined to be started. If the engine 22 is determined to be started, the engine 22 is started with cranking of the engine 22 by the motor MG1 through the cooperative control among the HVECU 70, the engine ECU 24, and the motor ECU 40, and shifts to the HV driving.

In the EV driving in the second CD mode, the HVECU 70 sets the required torque Tp* on the basis of the accelerator opening degree Acc and the vehicle speed V. Subsequently, a smaller value than in the first CD mode is set to the power limit Pmax, the set power limit Pmax is divided by the rotational speed Nm2 of the motor MG2, and the torque limit Tm2max of the motor MG2 is set. In the embodiment, the load limit Wout1 of the first battery 50 is set to the power limit Pmax.

Subsequently, it is determined whether the kickdown switch 84a is turned on or off. Then, when the kickdown switch 84a is turned off, a value obtained by limiting the required torque Tp* with the torque limit Tm2max is set to the torque command Tm2* of the motor MG2, and is transmitted to the motor ECU 40. If the torque command Tm2* is received, the motor ECU 40 performs switching control of the plurality of switching elements of the inverter 42 such that the motor MG2 is driven by the torque command Tm2*.

When the kickdown switch 84a is turned on, the engine 22 is determined to be started. If the engine 22 is determined to be started, the engine 22 is started with cranking of the engine 22 by the motor MG1 through the cooperative control among the HVECU 70, the engine ECU 24, and the motor ECU 40, and shifts to the HV driving.

Additionally, in the EV driving in the first CD mode or the second CD mode, the HVECU 70 sets a target voltage VH* of the high-voltage system power line 46 on the basis of the torque command Tm2* and the rotational speed Nm2 of the motor MG2, and calculates a target power Pm2* of the motor MG2 as a product of the torque command Tm2* of the motor MG2 and the rotational speed Nm2. Subsequently, a torque target electric current ILsum* of the reactors L1, L2 of the first and second boosting converters 54, 55 is set on the basis of the voltage VH and the target voltage VH* of the high-voltage system power line 46 and the target power Pm2* of the motor MG2. Then, target electric currents IL1*, IL2* of the reactors L1, L2 are calculated by multiplying the total target electric current ILsum* by distribution factors (1-Di), Di, and the target electric currents IL1*, IL2* are transmitted to the motor ECU 40. Here, the distribution factor Di is a ratio of the electric current IL2 of the reactor L2 to a total electric current ILsum of the reactors L1, L2. A method of setting the distribution factor Di will be described below. The motor ECU 40 performs switching control of the transistors T11, T12, T21, T22 of the first and second boosting converters 54, 55 such that the electric currents IL1, IL2 of the reactors L1, L2, become the target electric currents IL1*, IL2* if the target electric currents IL1*, IL2* of the reactors L1, L2 are received. By such control, when the distribution factor Di is small the electric current IL2 of the reactor L2 to the total electric current ILsum becomes smaller and a discharge power Pb2 (=Vb2·Ib2) from the second battery 51 to a total power Pbsum from the first and second batteries 50, 51 becomes smaller, as compared to that when the distribution factor Di is large.

Since the HV driving in the first CD mode or the second CD mode and the EV driving or the HV driving in the CS mode do not make the nucleus of the present disclosure, detailed description thereof will be omitted.

Figure 3:
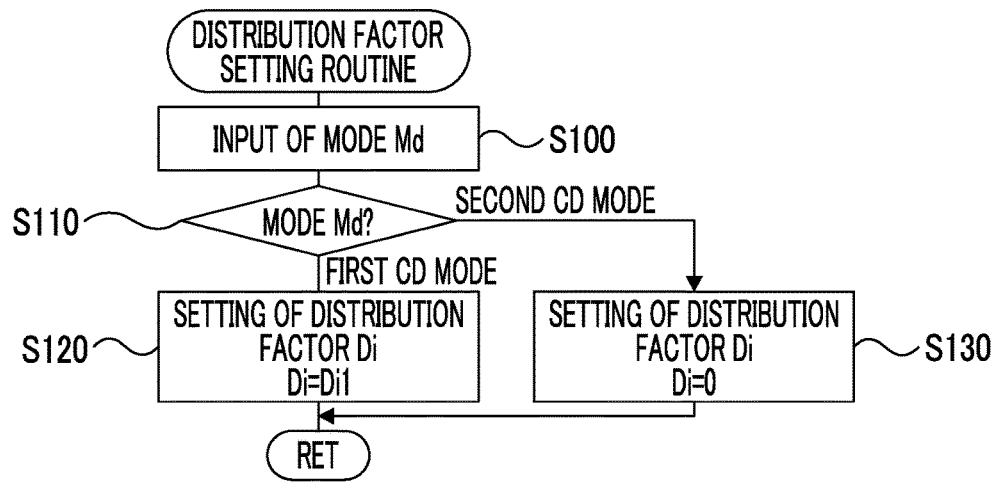
FIG. 3 is a flowchart illustrating an example of a distribution factor setting routine to be executed by an HVECU illustrated in FIG. 1.

Next, the operation of the hybrid automobile 20 of the embodiment configured in this way, particularly, the operation when setting the distribution factor Di used for the control of the first and second boosting converters 54, 55 in the EV driving in the first CD mode or the second CD mode will be described. FIG. 3 is a flowchart illustrating an example of a distribution factor setting routine to be executed by the HVECU 70 of the embodiment. This routine is repeatedly executed during the EV driving in the first CD mode or the second CD mode.

If the distribution factor setting routine is executed, the HVECU 70 first inputs a mode Md (Step S100). Here, as the mode Md, a mode (the first CD mode or the second CD mode) set according to the state of the mode changeover switch 89 is input.

If data are input in this way, it is determined whether the input mode Md is the first CD mode or the second CD mode (Step S110). Then, when the mode Md is the first CD mode, a positive value Di1 is set to the distribution factor Di (Step S120), and a main routine is ended. Here, the value Di1 may be set according to a relationship between the state of charges SOC1, SOC2 or a relationship between the load limits Wout1, Wout2 of the first and second batteries 50, 51, may be set such that the efficiency of the overall vehicle becomes excellent, or may be set using a constant value (for example, the ratio of the rated capacity Sr2 of the second battery 51 to the sum of the rated capacities Sr1, Sr2 of the first and second batteries 50, 51, or the like).

When the mode Md is the second CD mode in Step S110, a value 0 is set to the distribution factor Di (Step S130), and the main routine is ended. In this case, since the target the electric current IL2* of the reactor L2 of the second boosting converter 55 reaches the value 0, the driving of the second boosting converter 55 is stopped. In addition to this, the connection between the second battery 51 and the second boosting converter 55 may be released by turning off the second system main relay 57.

In this way, in the EV driving in the second CD mode (the mode in which the driving performance is limited as compared to the first CD mode), the value 0 is set to the distribution factor Di. Accordingly, the electric current IL2 (the discharge power Pb2 from the second battery 51) of the reactor L2 becomes smaller than that during the EV driving in the first CD mode (reaches the value 0). Hence, (the degree of) a decrease of the state of charge SOC of the second battery 51 or a rise in the temperature the second battery 51 can be suppressed, and that the load limit Wout2 of the second battery 51 can be kept from becoming small. As a result of this, when the mode changeover switch 89 is operated after that and is switched from the second CD mode to the first CD mode, occurrence of a problem that sufficient power cannot be discharged from the second battery 51 in the first CD mode can be suppressed, and insufficient exhibition of the driving performance according to the first CD mode can be suppressed. In addition, as described above, the first battery 50 is cooled by the cooling device (not illustrated) (suppressed in temperature rise) such that the temperature Tb1 is within its allowable temperature range even when only the first battery 50 out of the first and second batteries 50, 51 exchanges power with the motors MG1, MG1. Thus, a problem does not occur even if the distribution factor Di has the value 0 in the second CD mode.

In the hybrid automobile 20 of the embodiment described above, the positive value Di1 is set to the distribution factor Di during the EV driving in the first CD mode, and the value 0 is set to the distribution factor Di during the EV driving in the second CD mode. Then, the first and second boosting converters 54, 55 are controlled such that the electric current IL2 (the discharge power Pb2 from the second battery 51) of the reactor L2 when the distribution factor Di is smaller becomes smaller than that when the distribution factor Di is larger. Accordingly, when switching is performed from the second CD mode to the first CD mode; occurrence of a problem that sufficient power cannot be discharged from the second battery 51 in the first CD mode can be suppressed, and insufficient exhibition of the driving performance according to the first CD mode can be suppressed.

In the hybrid automobile 20 of the embodiment, the positive value Di1 is set to the distribution factor Di during the EV driving in the first CD mode, and the value 0 is set to the distribution factor Di during the EV driving in the second CD mode. However, during the EV driving in the second CD mode, a value larger than the value 0 and smaller than the value Di1 may be set to the distribution factor Di.

In the hybrid automobile 20 of the embodiment, the sum of the load limits Wout1, Wout2 of the first and second batteries 50, 51 is set to the power limit Pmax during the EV driving in the first CD mode, and the load limit Wout1 of the first battery 50 is set to the power limit Pmax during the EV driving in the second CD mode. However, the present disclosure is not limited to this, and the power limit Pmax during the EV driving in the second CD mode may be made smaller than the power limit Pmax during the EV driving in the first CD mode. Hence, during the EV driving in the first CD mode, a value slightly smaller than the sum of the load limits Wout1, Wout2 of the first and second batteries 50, 51 may be set to the power limit Pmax. Additionally, during the EV driving in the second CD mode, a value slightly larger than or slightly smaller than the load limit Wout1 of the first battery 50 is set to the power limit Pmax. In addition, when a value slightly larger than the load limit Wout of the first battery 50 is set to the power limit Pmax during the EV driving in the second CD mode, it is necessary to set the distribution factor Di such that the target power Pm2* of the motor MG2 can be provided depending on the power from the first and second batteries 50, 51 (the discharge power from the first battery 50 is within the range of the load limit Wout1).

Although not particularly described in the hybrid automobile 20 of the embodiment, the distribution factor Di during the HV driving in the first CD mode or the second CD mode may be set according to the mode Md similar to during the EV driving in the first CD mode or the second CD mode, and the first and second boosting converters 54, 55 may be controlled such that the electric current IL2 (the discharge power Pb2 from the second battery 51) of the reactor L2 when this distribution factor Di is small becomes smaller than that when the distribution factor Di is large.

In the hybrid automobile 20 of the embodiment, the first CD mode and the second CD mode are included as the CD mode, and the switching between the first CD mode and the second CD mode is performed according to the operation of the changeover switch 89. However, a third CD mode in addition to the first CD mode and the second CD mode may be included as the CD mode, and switching among the first CD mode, the second CD mode, and the third CD mode may be performed according to the operation of the changeover switch 89. In addition, the third CD mode is the same mode as the first CD mode except that the engine 22 is not started irrespective of the required torque Tp* or the state of the kickdown switch 84a (the EV driving is continued). In the EV driving in the third CD mode, similar to the EV driving in the first CD mode, the motor MG2 is controlled by setting the sum of the load limits Wout1, Wout2 of the first and second batteries 50, 51 to the power limit Pmax setting the torque command Tm2* of the motor MG2 within the range of the sum, and the first and second boosting converters 54, 55 are controlled by setting the value Di1 to the distribution factor Di. Even in this case, similar to the embodiment, during the EV driving in the second CD mode, the value 0 is set to the distribution factor Di. Accordingly, when the mode changeover switch 89 is operated after that and is switched from the second CD mode to the first CD mode or the third CD mode, occurrence of a problem that sufficient power cannot be discharged from the second battery 51 in the first CD mode or the third CD mode can be suppressed, and insufficient exhibition of the driving performance according to the first CD mode or the third CD mode can be suppressed.

In the hybrid automobile 20 of the embodiment, the motor ECU 40 and the HVECU 70 are included. However, the motor ECU 40 and the HVECU 70 may be constituted as a single electronic control unit.

Figure 4:
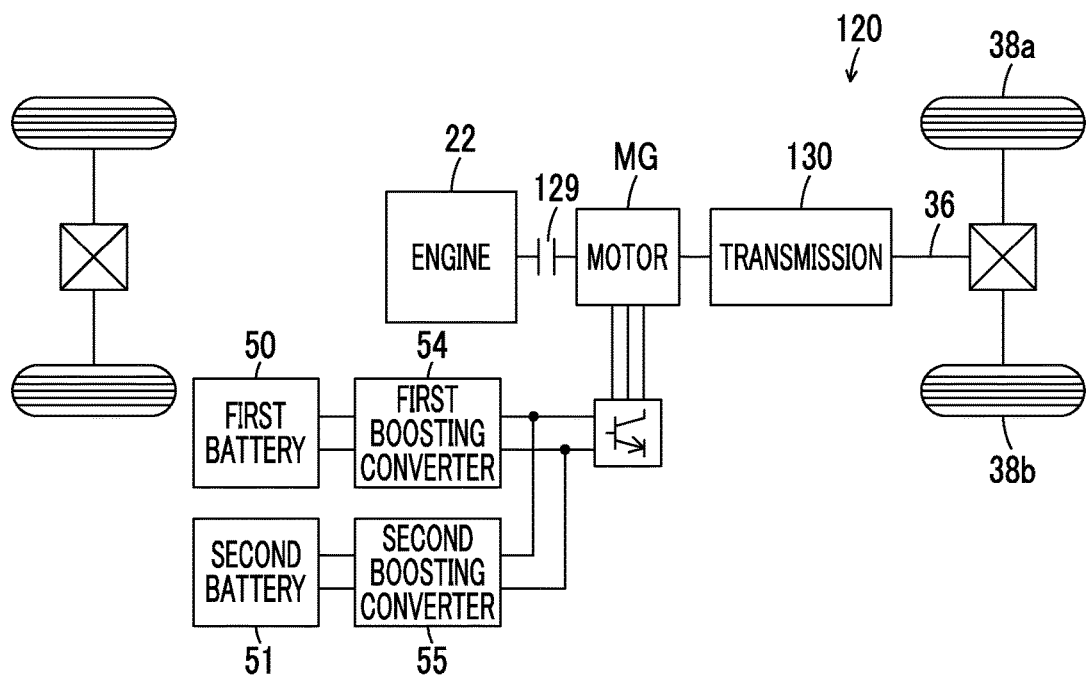
FIG. 4 is a configuration view illustrating the outline of the configuration of an automobile equipped with a drive motor of a first modification example of the present embodiment.
Figure 5:
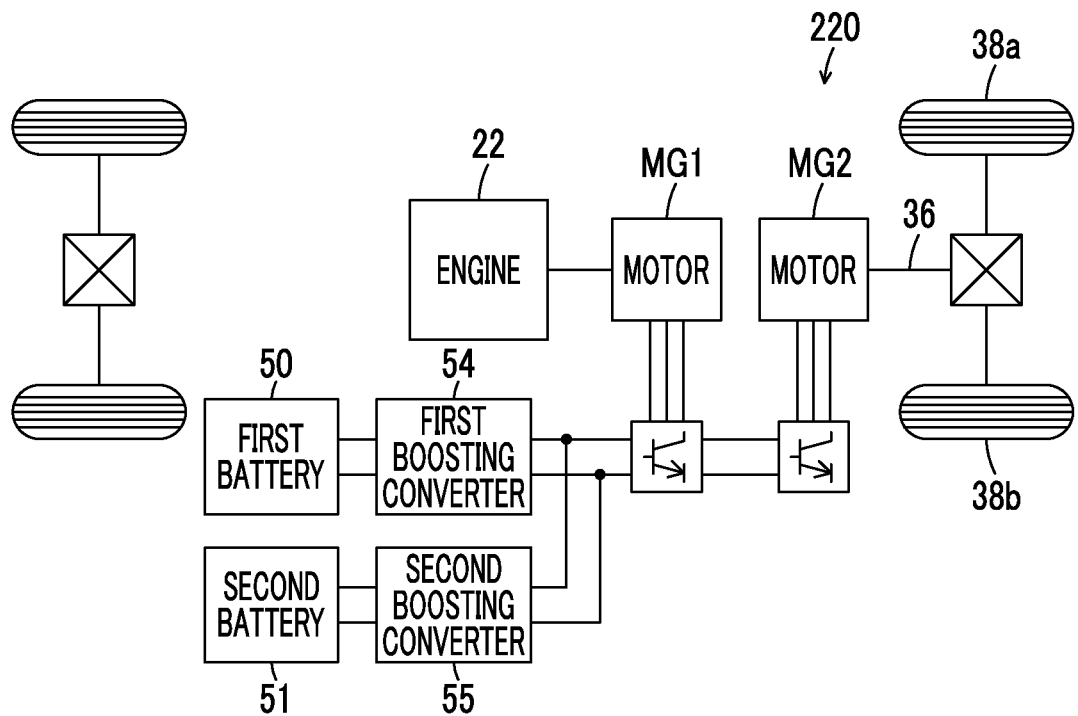
FIG. 5 is a configuration view illustrating the outline of the configuration of an automobile (hybrid automobile) equipped with a drive motor of a second modification example of the present embodiment.
Figure 6:
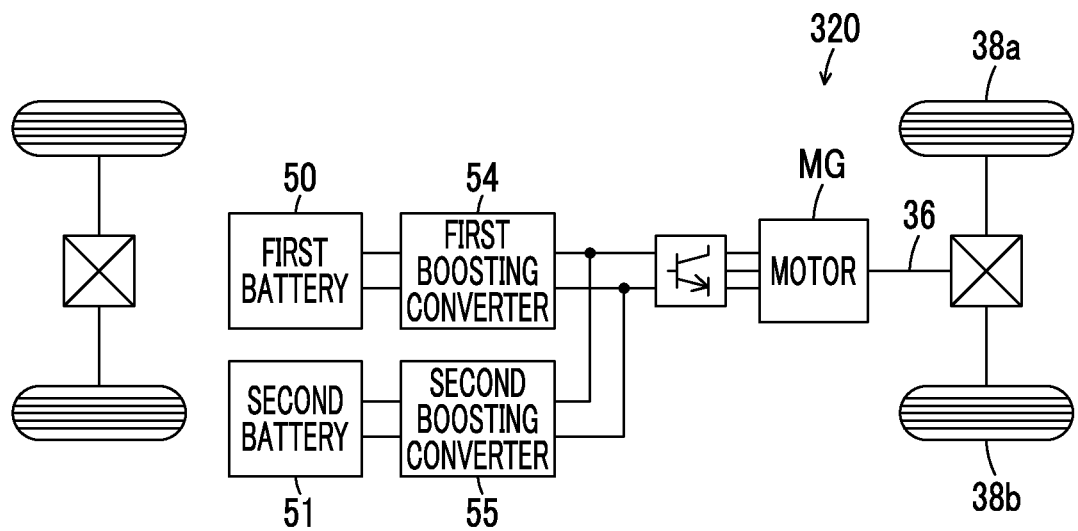
FIG. 6 is a configuration view illustrating the outline of the configuration of an automobile (electric automobile) equipped with a drive motor of a third modification example of the present embodiment.

The hybrid automobile 20 of the embodiment has a configuration in which the engine 22 and motor MG1 are connected to the driving shaft 36 coupled to the driving wheels 38a, 38b via the planetary gear set 30, and the motor MG2 is connected to the driving shaft 36. However, as illustrated in a hybrid automobile 120 of a first modification example of FIG. 4, a configuration in which a motor MG is connected to the driving shaft 36 coupled to the driving wheels 38a, 38b via a transmission 130 and the engine 22 is connected to a rotating shaft of the motor MG via a clutch 129 may be adopted. Additionally, as illustrated in a hybrid automobile 220 of a second modification example of FIG. 5, a configuration of a so-called series hybrid automobile in which a motor MG1 for power generation is connected to an output shaft of the engine 22, and a motor MG2 for driving is connected to the driving shaft 36 coupled to the driving wheels 38a, 38b may be adopted. Moreover as illustrated in an electric automobile 320 of a third modification example of FIG. 6, a configuration of an electric automobile in which a motor MG for driving is connected to the driving shaft 36 coupled to the driving wheels 38a, 38b may be adopted.

A correspondence relationship between the main elements of the embodiment and the main elements of the present disclosure described in the Summary will be described. In the embodiment, the motor MG2 is an example of the "motor". The first battery 50 is an example of the "first battery". The second battery 51 is an example of "the second battery". The first boosting converter 54 is an example of "the first boosting converter". The second boosting convener 55 is an example of "the second boosting converter". The HVECU 70 and the motor ECU 40 are an example of the "electronic control unit".

In addition, since the correspondence relationship between the main elements of the embodiment and the main elements of the present disclosure described in the Summary is an example for specifically explaining the modes for carrying out the present disclosure in which the embodiment is described in the Summary, the elements of the present disclosure described in the Summary are not limited. That is, interpretation regarding the present disclosure described in the Summary should be performed on the basis of the description of the Summary, and the embodiment is merely a specific example of the present disclosure described in the Summary.

Although the modes for carrying out the present disclosure have been described above using the embodiments, the present disclosure is not limited to such embodiments at all, and can be naturally carried out in various forms without departing from the scope of the present disclosure.

The present disclosure is available for an automobile manufacturing industry, and the like.

What is claimed is:

1. An automobile equipped with a drive motor, comprising:
   a first battery;
   a second battery configured to have a rated capacity smaller than a rated capacity of the first battery;
   a first boosting converter configured to supply a power from the first battery to the motor with boosting of a voltage inputted to the first boosting converter;
   a second boosting converter configured to supply a power from the second battery to the motor with boosting of a voltage inputted to the second boosting converter;
   an electronic control unit configured to
   (i) set an execution mode from a plurality of modes including a first mode and a second mode and control the motor on the basis of the execution mode, the first mode being a mode in which the motor is driven in a range having a first output as an upper limit and the second mode being a mode in which the motor is driven in a range having a second output smaller than the first output as an upper limit, (ii) control the first boosting converter and the second boosting converter according to the execution mode, and (iii) control the first boosting converter and the second boosting converter such that a distribution factor when the execution mode is the second mode becomes smaller than a distribution factor when the execution mode is the first mode, the distribution factor being a ratio of a discharge power of the second battery to a total discharge power of the first battery and the second battery, wherein the electronic control unit is configured to perform control such that the distribution factor when the execution mode is the first mode becomes a predetermined value and such that the distribution factor when the execution mode is the second mode becomes larger than a value 0 and becomes a value smaller than the predetermined value.

2. The automobile according to claim 1, wherein the electronic control unit is configured to stop driving of the second boosting converter when the execution mode is the second mode.

3. The automobile according to claim 1, wherein the electronic control unit is configured to:

(i) set the first output to a sum of an allowable discharge power of the first battery and an allowable discharge power of the second battery, and (ii) set the second output to the allowable discharge power of the first battery.

4. The automobile according to claim 1, wherein the electronic control unit is configured to:

(i) set an allowable discharge power of the second battery when a temperature of the second battery is higher than an allowable temperature range so as to be lower than the allowable discharge power when the temperature of the second battery is within the allowable temperature range, and (ii) set the allowable discharge power of the second battery when a state of charge of the second battery is smaller than an allowable ratio range so as to be smaller than the allowable discharge power when the state of charge of the second battery is within the allowable ratio range.

* * * * *